United States Patent [19]
Skinner

[11] 3,878,441
[45] Apr. 15, 1975

[54] CAPACITOR

[75] Inventor: Leonard Keith Skinner, Birmingham, England

[73] Assignee: The Lucas Electrical Company Limited, Birmingham, England

[22] Filed: Mar. 7, 1973

[21] Appl. No.: 338,944

[30] Foreign Application Priority Data
Mar. 14, 1972 United Kingdom............... 11718/72

[52] U.S. Cl................ 317/257; 317/242; 317/249 R
[51] Int. Cl.............................................. H01g 1/14
[58] Field of Search.................. 317/242, 257, 249 R

[56] References Cited
UNITED STATES PATENTS
| | | | |
|---|---|---|---|
| 2,667,573 | 1/1954 | Satinoff | 317/257 X |
| 3,141,983 | 7/1964 | Ward | 317/257 X |
| 3,274,464 | 9/1966 | Seiden | 317/249 R |
| 3,275,922 | 9/1966 | Meyer | 317/257 X |

*Primary Examiner*—E. A. Goldberg
*Attorney, Agent, or Firm*—Hill, Gross, Simpson, Van Santen, Steadman, Chiara & Simpson

[57] ABSTRACT

A capacitor including an insulating body supporting a conductor assembly. A conductor assembly includes first and second terminal members at opposite ends respectively of the body and a conductive link member extending through the body and electrically connecting the first and second terminal members. A metal strip encircles the exterior of the body adjacent the first terminal member, and the metal strip defines a first capacitor plate while the first conductor defines a second capacitor plate. The dielectric of the capacitor is provided by the material of the body lying between the first terminal and the metal strip.

4 Claims, 3 Drawing Figures

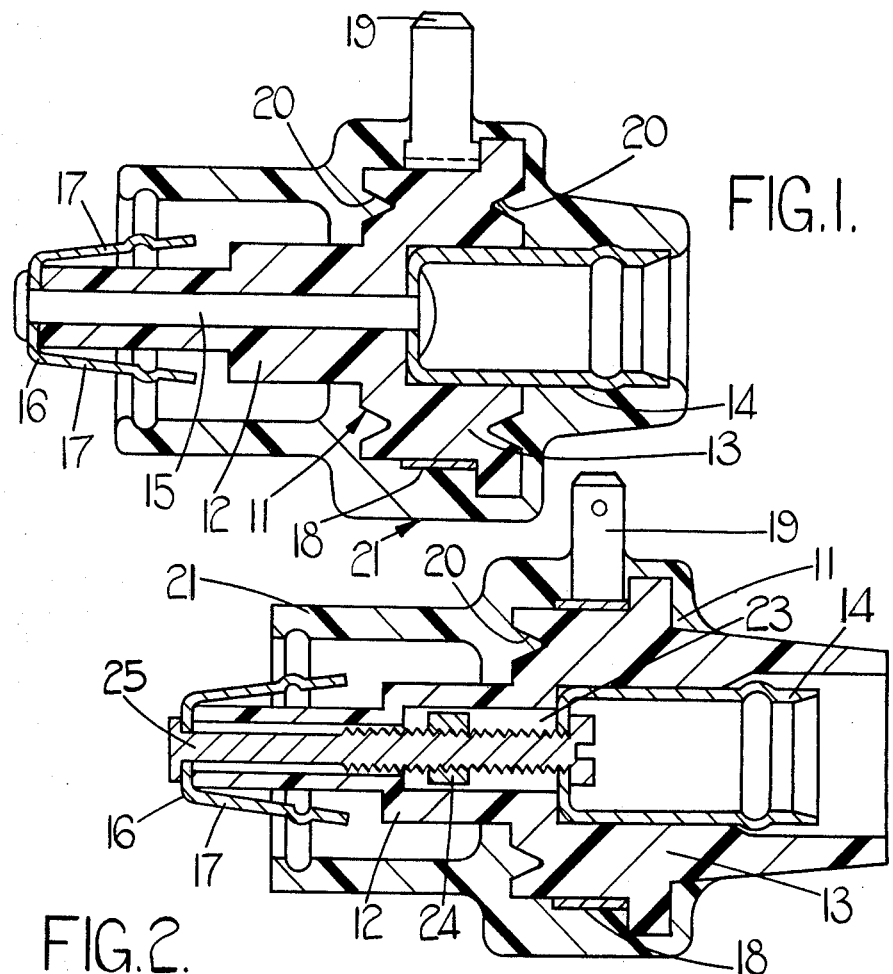
FIG.1.
FIG.2.
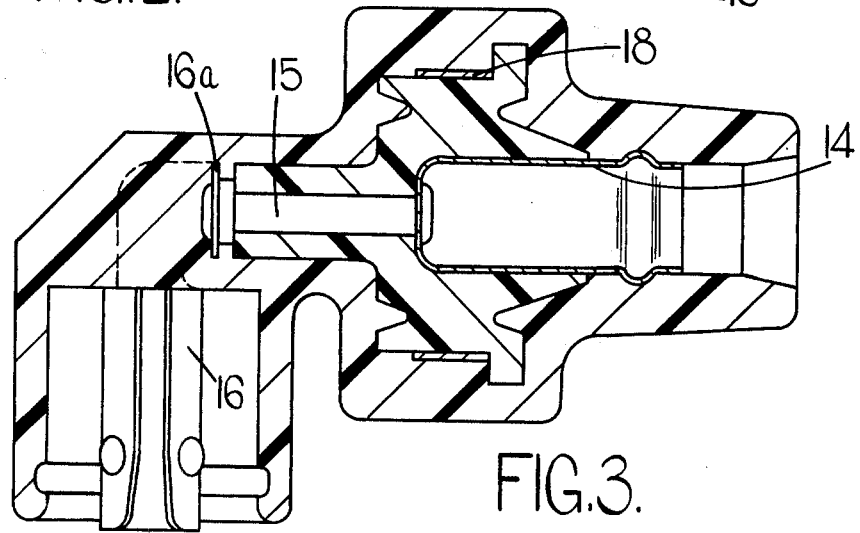
FIG.3.

CAPACITOR

This invention relates to a capacitor.

A capacitor according to the invention includes an insulating body, a conductor assembly carried by the body and including a first terminal member accessible at one end of the body and arranged to releasably engage a respective mating member, a second terminal member accessible at the other end of the body also arranged to releasably engage a respective mating member, and a conductive link extending within the body and electrically interconnecting the first and second terminal members, a metal strip on the exterior of the body, the metal strip having a third terminal member associated therewith, said strip constituting a first capacitor plate, the first terminal member constituting the second capacitor plate, and the body providing dielectric material between the first and second plates.

Preferably, the metal strip constituting the first capacitor plate is in the form of a band encircling the body intermediate the ends of the body.

Desirably, the first terminal member includes a cylindrical region which extends into the body, the cylindrical region defining the second capacitor plate.

Conveniently, the first and second terminal members are of complementary form so that the capacitor can be interposed between a terminal member similar to the second terminal member and a mating terminal member similar to the first terminal member with the electrical connection between the mating terminal members being completed by the conductor assembly of the capacitor.

Desirably, the capacitor includes an outer casing of insulating material leaving the first, second and third terminal members accessible but enclosing at least said metal strip constituting the first capacitor plate.

Preferably, the first terminal member is in the form of a hollow conductive sleeve arranged to receive, internally, a mating terminal member, the sleeve including a portion projecting from the body of the capacitor, and the outer surface of said projecting portion being encircled by the outer casing of the capacitor.

Desirably, the second terminal member is in the form of a plug part arranged to be received in a socket connector and the outer casing of the capacitor is arranged, adjacent the second terminal member, to encircle a socket terminal member engaging the second terminal member in use.

Conveniently the capacitor includes a conductive member electrically connected to the second capacitor plate and adjustable in position relative to the first capacitor plate whereby the capacitance of the capacitor can be adjusted.

Desirably said conductive member is defined by a nut held against rotation and the link member is in screw-threaded engagement with the nut so that the position of the nut relative to the first capacitor plate can be adjusted by rotation of the link member.

Conveniently the first and second terminal members are disposed with their axes at right angles.

In the accompanying drawings FIG. 1 is a sectional view of a capacitor in accordance with one example of the invention, and FIGS. 2 and 3 are views similar to FIG. 1 of modifications.

Referring first to FIG. 1 of the drawings, the capacitor includes a body 11 moulded in synthetic resin material and including a shank portion 12 and a head portion 13 of larger diameter than the shank portion 12. The body 11 is formed with an axially extending through bore having a region of larger diameter in the head portion 13 of the body 11. A shoulder is defined between the wider and narrower parts of the through bore of the body 11, and received in the wider part of the bore of the body 11 and abutting against said step is a first electrical terminal member 14. The terminal member 14 is in the form of a cylindrical sleeve closed at one end, the closed end of the sleeve abutting said step, and part of the sleeve projecting from the head 13. An elongated conductive rivet 15 serves to secure the terminal member 14 in position relative to the body, the rivet 15 having a head engaging the closed end of the terminal member 14 and a shank which extends within the bore of the body 11, and is deformed at its end remote from the terminal member 14 to secure a second terminal member 16 to the shank 12. The terminal member 16 includes a central hub which is trapped against the end face of the shank 12 by the rivet 15, and a pair of diametrically opposed arms 17 integral with the hub and extending therefrom towards the head 13 of the body 11. The arms 17 are inclined so that their free ends are spaced further from the axis of the body 11 than are their captive ends. The arms 17 are resilient, and are electrically connected to the first terminal 14 by way of the rivet 15 and the hub of the second terminal 16.

Encircling the head 13 is a metal band 18 having integral therewith a radially outwardly extending third terminal member 19 in the form of a blade connector. The band 18 is coaxial with the sleeve of the first terminal 14, the first terminal 14 lying within the confines of the band 18. The band 18 defines a first plate of the capacitor, being defined by that portion of the sleeve of the first terminal 14 adjacent the band 18, and the material of the head 13 constituting the dielectric material between the first and second capacitor plates.

An outer insulating casing 21 is moulded around the body, the casing enclosing the projecting portion of the first terminal 14 and the head of the body 11 including the band 18. The outer casing also encircles the shank 12 of the body 11 and part of the second terminal member 16. A clearance exists between the arms 17 of the terminal member 16 and the encircling portion of the casing 21 whereby a socket terminal member and its insulating surround can be received between the arms 17 and the adjacent part of the casing 21, the arms 17 being received within the sockets terminal. The third terminal member 19 projects from the casing 21, and the casing 21 is apertured to permit access to the socket terminal member 14. Ideally, the socket terminal 14 and the plug terminal member 16 are of complementary form, so that the capacitor can be interposed between a terminal member similar to the member 16, and a mating terminal member similar to the terminal member 14, the connection between the mating terminal members being completed by way of the conductor assembly 14, 15, 16 of the capacitor.

The body 11 can be moulded in a number of alternative synthetic resin materials, the choice of material depending on the capacitance required, and the intended environment of the capacitor. It is probable that materials such as polycarbonate, polypropylene, glass filled nylon, and polyethyleneterephthalate will be suitable to form the body, with polypropylene being preferred.

Desirably, the outer casing is moulded in flexible synthetic resin material for example polyurethane. The end surfaces of the head 13 of the body 11 are formed with respective V-shaped grooves 20 encircling the shank 12 and the terminal 14 respectively, the grooves 20 minimising the risk of tracking between the band 18 and the terminals 14 and 16.

In one practical embodiment, the capacitor described above is utilized in internal combustion engine analyser equipment. The capacitor is used as part of a voltage divider so that the equipment can measure the ignition coil output voltage and the spark plug voltage of the spark ignition system of the internal combustion engine. When the equipment is being used to measure the ignition coil output voltage the output lead of the ignition coil is removed from the output terminal of the ignition coil and is inserted into the first terminal 14 of the capacitor, the output lead carrying a terminal similar to the terminal member 16 of the capacitor. The capacitor is then engaged with the ignition coil so that the second terminal member 16 mates with the output terminal of the ignition coil, the output terminal of the ignition coil being similar to the terminal member 14 of the capacitor. The insulating outer sleeve of the ignition coil output terminal is received within the outer casing of the capacitor, the casing of the capacitor being flexible, and gripping the insulating sleeve of the ignition coil. Thus the output circuit of the ignition coil is completed from the output terminal of the ignition coil by way of the terminal member 16, the rivet 15 and the terminal member 14 to the output lead. The output voltage of the ignition coil will of course determine the voltage appearing on the second plate of the capacitor, and therefore the voltage appearing at the terminal 19.

When the capacitor is used to measure the spark plug voltage then the capacitor is interposed between the high tension output terminal of the vehicle ignition coil, and the associated high tension input terminal of the vehicle ignition distributor.

The modified form of capacitor shown in FIG. 2 differs from that shown in FIG. 1 principally in that the shank portion 12 of the body 11 is formed with a bore 23 of noncircular cross-section, and slidably received in the bore is an electrically conductive nut 24. The elongated conductive rivet 15 is replaced by an elongated conductive bolt 25 the head of which engages the base of the terminal member 14, and the free end of the shank of which is deformed to retain the terminal member 16 in position. The nut 24 is in screw-threaded engagement with the bolt 25. The bolt 25 is capable of rotation, but is held against axial movement relative to the body 11 while the nut 24 can move axially within the bore 23, but cannot rotate. The nut 24 is electrically connected to the terminal member 14, and by rotating the bolt 25 the position of the nut relative to the conductive band 18 can be altered. The position of the nut 24 relative to the band 18 effects the capacitance of the capacitor, and so the capacitance of the capacitor can be adjusted by rotation of the bolt 25.

In the modified arrangement shown in FIG. 3 the terminal member 16 extends at right angles to the rivet 15 and the axis of the terminal member 14, the terminal member 16 having a connecting portion 16a at its inner end which is engaged by the rivet 15.

It will be appreciated that the modification shown in FIG. 2 could be applied to the arrangement of FIG. 3 if desired.

The arrangement shown in FIGS. 2 and 3 are intended to be utilized in exactly the same manner as the arrangement shown in FIG. 1, the arrangement of FIG. 3 being utilized for example where the available space is insufficient to permit the use of a capacitor where the first and second terminals are axially aligned.

I claim:

1. A capacitor for use in a circuit having first and second complementary shaped mating and releasably engageable circuit elements, comprising:
   an insulating body;
   a conductor assembly carried by the body and including
      a first terminal member accessible at one end of said body and including a hollow conductive sleeve arranged to internally receive the first mating circuit element,
      a second terminal member accessible at the other end of said body and including a spring means plug part arranged to be received in the second mating circuit element, and
      a conductive rivet means having a width less than the width of said first and second terminal members extending within said body and electrically interconnecting said first and second terminal members;
   a metal strip on the exterior of said body having a third terminal member connected thereto;
   said strip constituting a first capacitor plate, said first terminal member constituting a second capacitor plate and said body including a solid dielectric material between said first and second plates and in direct contact with said conductive rivet means; and
   an outer casing of insulating material about said body leaving said first, second and third terminal members accessible but enclosing at least said metal strip constituting said first capacitor plate,
   said sleeve having a portion projecting from said body and the outer surface of said projecting portion being encircled by said outer casing,
   said outer casing being arranged adjacent to said second terminal member to encircle the second mating circuit element engaging said second terminal member in use.

2. A capacitor as claimed in claim 1 wherein the metal strip constituting the first capacitor plate is in the form of a band encircling the body intermediate the ends of the body.

3. A capacitor as claimed in claim 1 wherein the first terminal member includes a cylindrical region which extends into the body, the cylindrical region defining the second capacitor plate.

4. A capacitor as claimed in claim 1 wherein the first and second terminal members are disposed with their axes at right angles.

* * * * *